No. 797,875. PATENTED AUG. 22, 1905.
W. G. & J. V. SUGG.
COTTON CHOPPER AND CULTIVATOR.
APPLICATION FILED MAR. 16, 1905.
3 SHEETS—SHEET 3.
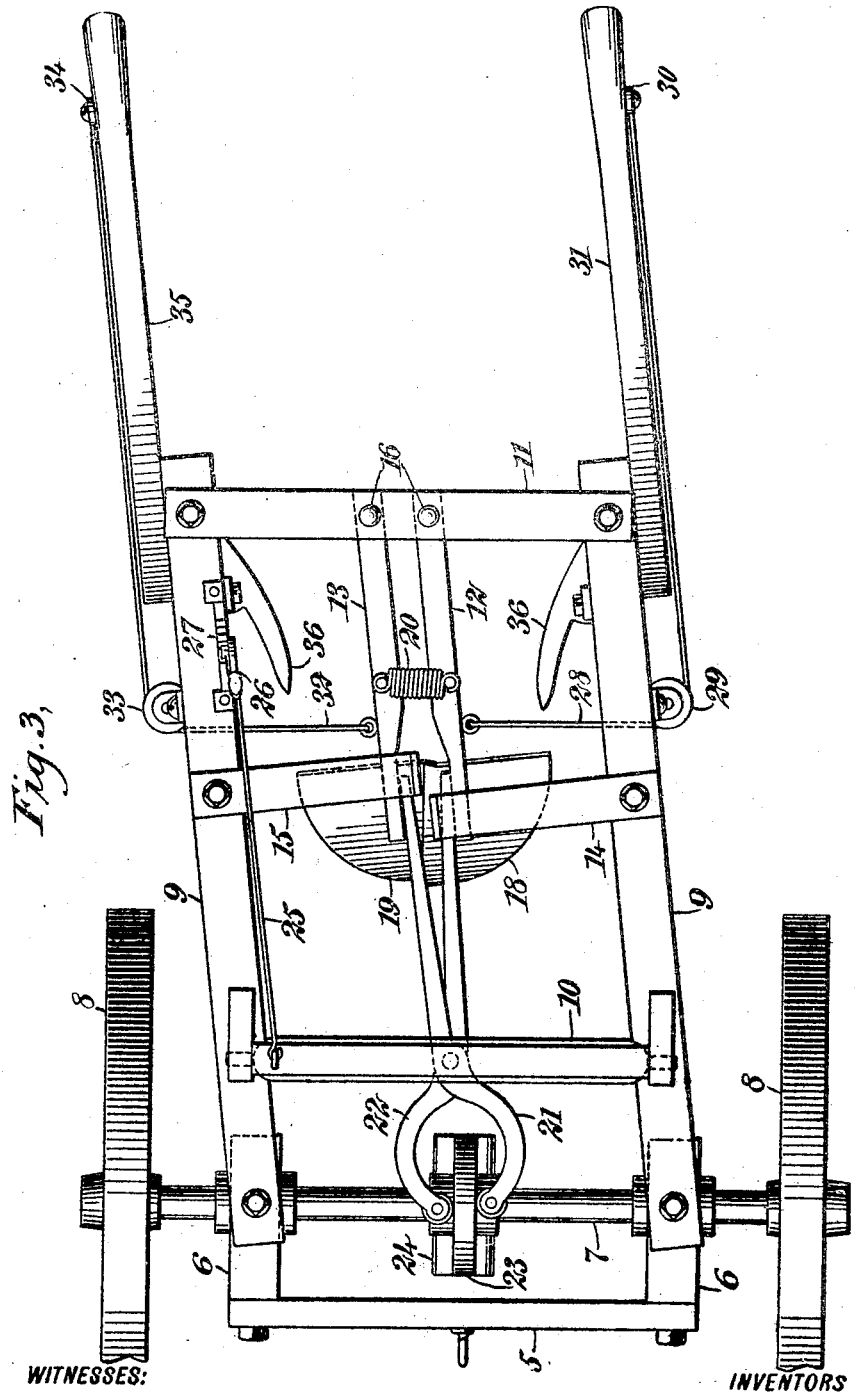
WITNESSES:
Edward Thorpe
C. R. Ferguson
INVENTORS
William G. Sugg
John V. Sugg
BY
ATTORNEYS

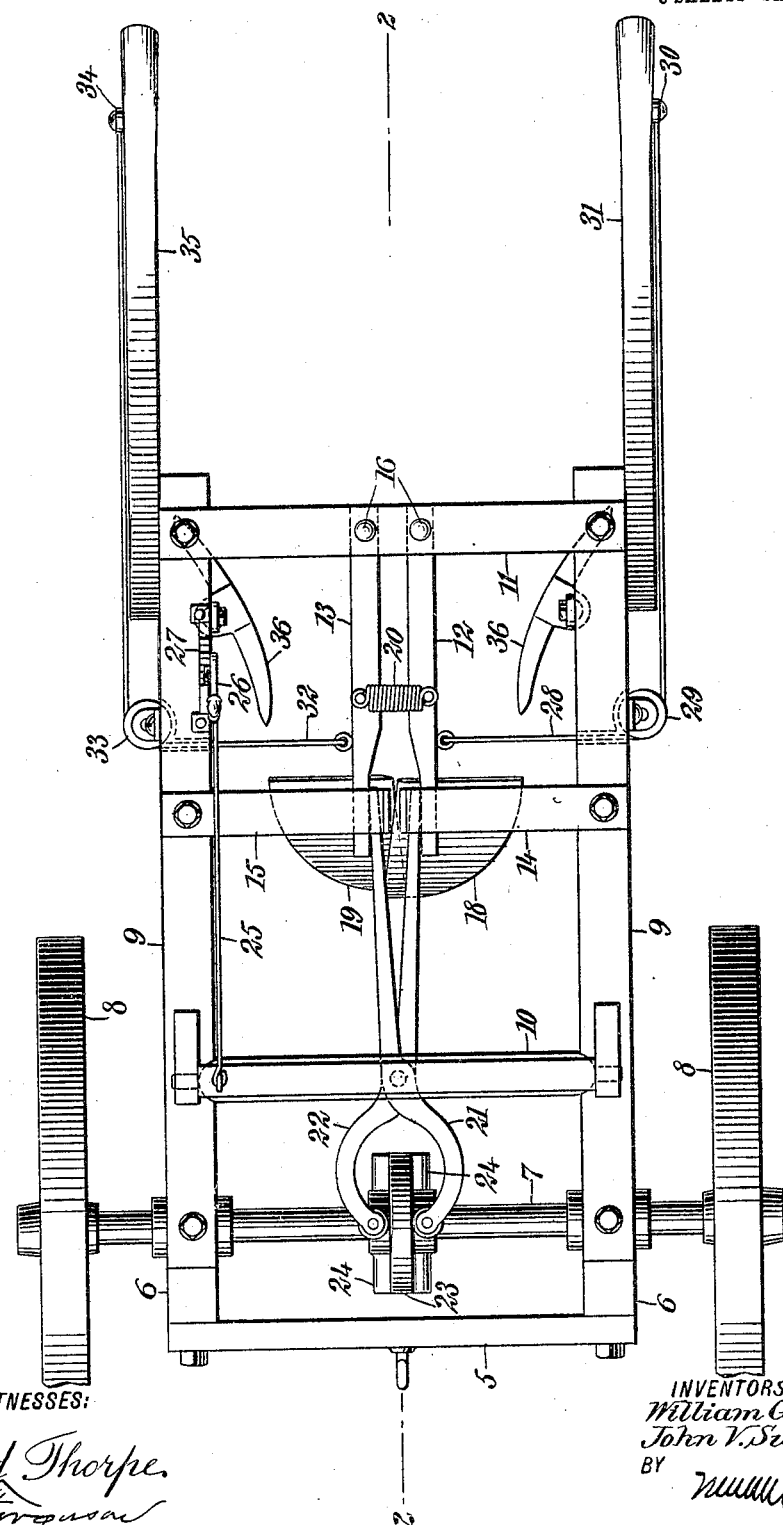

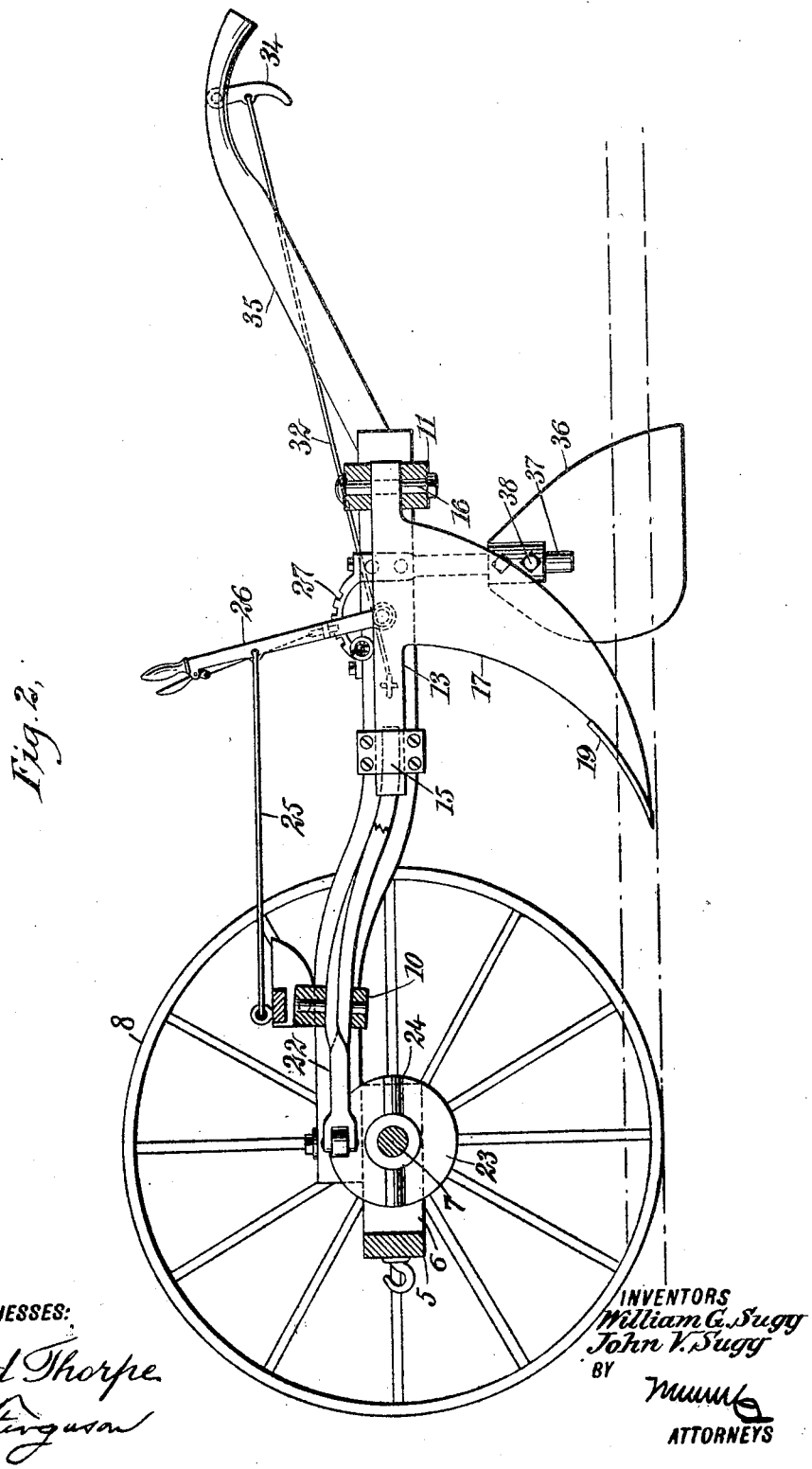

UNITED STATES PATENT OFFICE.

WILLIAM GEORGE SUGG AND JOHN VALVES SUGG, OF SEARCY, ARKANSAS, ASSIGNORS TO THE NEW SOUTH IMPLEMENT CO., OF HENDERSON, KENTUCKY.

COTTON CHOPPER AND CULTIVATOR.

No. 797,875.          Specification of Letters Patent.          Patented Aug. 22, 1905.

Application filed March 16, 1905. Serial No. 250,367.

*To all whom it may concern:*

Be it known that we, WILLIAM GEORGE SUGG and JOHN VALVES SUGG, citizens of the United States, and residents of Searcy, in the county of White and State of Arkansas, have invented a new and Improved Cotton Chopper and Cultivator, of which the following is a full, clear, and exact description.

This invention relates to improvements in machines for chopping and cultivating cotton, the object being to provide a machine of this character by means of which scraping, dirting, and chopping may be done practically in one operation, thus causing a great saving of time and labor in the cultivation of cotton.

It may be here stated that while we have designated the machine as a "cotton-chopper" it will be obvious from the general description to follow that it may be used for chopping out corn or similar crops.

We will describe a cotton chopper and cultivator embodying our invention, and then point out the novel features in the appended claims.

Reference is to be had to the accompanying drawings, forming a part of this specification, in which similar characters of reference indicate corresponding parts in all the figures.

Figure 1 is a plan of a machine embodying our invention. Fig. 2 is a section on the line 2 2 of Fig. 1, and Fig. 3 is also a plan showing the parts in different position from that of Fig. 1.

Referring to the drawings, 5 designates the front bar of a wheel-supported frame, and 6 the side bars thereof, in which the axle 7 is mounted to rotate. On the axle 7 are wheels 8, either one of which may be rigidly fixed to the axle. Mounted for lateral swinging movement relatively to the wheel-supported frame is a tool-carrying frame comprising side rails 9, connected by cross-bars 10 11. These cross-bars are pivotally connected to the bars 9, so that the frame may readily swing laterally.

Extended forward and having swinging connection with the cross-bar 11 are arms 12 13, the front ends of which are slidable in guides 14 15, attached to the side rails 9 of the swinging frame. As clearly shown in Fig. 2, the rear ends of the arms are mounted on pivot-pins 16, and extended downward from the arms are hangers 17, to which the scraping and chopping plates 18 19 are attached, these plates being arranged slightly to overlap their adjacent edges while chopping out the cotton. They are moved together, as here shown, by means of a spring 20, and as a means for automatically swinging them to open position we employ crossed or tongs-like levers 21 22, the rear ends of which engage against the inner sides of the arms 12 13. The forward ends of the levers 21 22 engage with a cam-wheel 23, rigidly connected to the axle 7 and having at its opposite sides cam projections 24, which by engaging with the forward portions of the arms 21 22 or with the rollers thereby will force the front ends apart and also as the levers are crossed will force the rear ends apart, consequently separating the chopping-blades until the rollers carried by the front portions of the levers 21 22 pass over the cam projections and engage with the body of the wheel. At this time the spring 20 will operate the choppers. In other words, by the mechanism above described the choppers will be actuated at regular intervals. In some instances it may be desired to operate them at irregular intervals, and therefore to provide for this it will be noted that the cross-bar 10 to which the levers 21 22 are pivoted is mounted to rock in bearings on the side rails 9. Extended rearward from this rocking bar 10 is a rod 25, the rear end of which is attached to a lever 26, carrying a pawl for engaging with a segment-rack 27. When the lever 26 is in its rearward position, the front ends of the levers 21 and 22 will be raised above the plane of the cam-wheel, and then the chopping-blades can be operated manually at irregular intervals, as before mentioned. For this purpose a cord or cable 28 extends from the arm 12 around a pulley 29 and thence to a finger trip-lever 30, mounted to swing on the handle 31 adjacent to the under grip thereof. From the arm 13 a similar cord or cable 32 passes around a pulley 33 to a lever 34 on a handle 35. Carried by said bars 9 of the swinging frame rearward of the choppers are the dirting-blades 36. These blades 36 are adjustable vertically on rods 37 depending from said side bars 9, and the blades are also adjusted as to angle by means of set-bolts 38.

It is important to state that by the lateral swinging motion of the frame the operator of the machine is enabled to keep the device exactly in line with the row.

Having thus described our invention, we claim as new and desire to secure by Letters Patent—

1. A machine for the purpose described comprising a wheel-supported frame, a frame mounted for lateral swinging movement on the first-named frame, choppers carried by the swinging frame, means for causing irregular movements of the choppers and means for moving the choppers toward and from each other.

2. A machine for the purpose specified comprising a wheel-mounted frame, a frame having lateral swinging connection therewith, arms pivoted to the swinging frame and extended forward therefrom, hangers on said arms, chopper-blades mounted on the hangers, means for manually operating the blades, crossed levers engaging with said arms, and a cam-wheel engaging with the forward ends of said levers for causing a separating movement of said arms.

3. A machine for the purpose described comprising a wheel-mounted axle, a frame in which said axle turns, a frame having lateral swinging movement with relation to the first-named frame, arms extended forward from the rear portion of the swinging frame, the said arms being pivoted to swing toward and from each other, chopper-blades carried by said arms, a rocking bar mounted on the lateral swinging frame, crossed levers pivoted to said rocking bar, the rear ends thereof engaging with said arms, a wheel on the machine-axle having cam-surfaces for engaging with the front ends of said levers, and means for rocking said rocking bar to move the forward ends of the levers out of engagement with the cam-wheel.

4. A machine for the purpose described comprising a wheel-supported frame, a frame having lateral swinging motion on said wheel-supported frame, a cross-bar pivotally connected to the rear ends of the swinging frame, arms pivoted to said cross-bar and extended forward therefrom, a spring mechanism for moving said arms toward each other, chopper-blades carried by said arms, guides for the forward ends of the arms, levers engaging with said arms and actuated by the forward movements of the machine to separate the chopper-blades, means for moving said levers from operative position, and means for manually separating the chopper-blades.

5. A machine for the purpose described comprising a wheel-supported frame, a frame mounted for material swinging movement on the first-named frame, choppers carried by the swinging frame, rods depending from the swinging frame rearward of the choppers, and blades adjustable vertically and axially on said rods.

In testimony whereof we have signed our names to this specification in the presence of two subscribing witnesses.

WILLIAM GEORGE SUGG.
JOHN VALVES SUGG.

Witnesses:
  WALLER G. CALDWELL,
  WM. F. SALE.